United States Patent
Sullivan

(10) Patent No.: US 12,406,644 B2
(45) Date of Patent: Sep. 2, 2025

(54) MUSIC SERVICE FOR THE DETECTION OF COPYRIGHT INFRINGEMENT

(71) Applicant: George Sullivan, Scarborough, ME (US)

(72) Inventor: George Sullivan, Scarborough, ME (US)

(*) Notice: Subject to any disclaimer, the term of this patent is extended or adjusted under 35 U.S.C. 154(b) by 377 days.

(21) Appl. No.: 18/116,469

(22) Filed: Mar. 2, 2023

(65) Prior Publication Data

US 2024/0105152 A1 Mar. 28, 2024

Related U.S. Application Data

(60) Provisional application No. 63/409,358, filed on Sep. 23, 2022.

(51) Int. Cl.
*G10H 1/00* (2006.01)
*G06F 21/10* (2013.01)

(52) U.S. Cl.
CPC ....... *G10H 1/0025* (2013.01); *G06F 21/1015* (2023.08)

(58) Field of Classification Search
CPC .............. G10H 1/0025; G10H 1/0008; G10H 2210/325; G10H 2210/385; G10H 2240/145; G10H 1/20; G06F 21/10; G06F 21/1015; G06F 21/1011; G06F 21/1013; G06F 21/16; G06F 21/1014; G06F 21/6209; G06F 21/109; G06F 21/60; H04L 2463/101
See application file for complete search history.

(56) References Cited

U.S. PATENT DOCUMENTS

| | | | |
|---|---|---|---|
| 5,496,962 A | 3/1996 | Meier | |
| 7,076,035 B2 | 7/2006 | Loudermilk | |
| 7,102,069 B2 | 9/2006 | Georges | |
| 2002/0152261 A1* | 10/2002 | Arkin | G06F 21/10 709/225 |
| 2002/0152262 A1* | 10/2002 | Arkin | H04L 9/40 709/225 |
| 2003/0131715 A1* | 7/2003 | Georges | G10H 1/0025 84/609 |
| 2005/0198061 A1* | 9/2005 | Robinson | H04L 67/1057 707/999.102 |
| 2007/0071205 A1* | 3/2007 | Loudermilk | G10H 1/0025 379/162 |

(Continued)

*Primary Examiner* — Yogeshkumar Patel
(74) *Attorney, Agent, or Firm* — Akerman LLP

(57) ABSTRACT

A system to detect an infringing audio composition is disclosed. The system is configured to receive an audio file from a user; prepare track samples based on the audio file to compare with audio files stored with a digital rights repository; determine an original audio recording from the digital rights repository; prepare an acapella version of the original audio recording and/or an instrumental version based on the original audio recording; process, by iteratively varying a pitch, a tempo and/or a key of, the versions to create a processed iteration of each version; automatically compare the processed iterations of the audio files stored with a digital rights repository; determine a match between the processed iterations and the audio files stored with the digital rights repository; and determine a digital rights action to take based on the match between the processed iteration of each of the versions.

20 Claims, 6 Drawing Sheets

(56) References Cited

U.S. PATENT DOCUMENTS

| | | | |
|---|---|---|---|
| 2008/0247543 A1* | 10/2008 | Mick | G06F 16/743 |
| | | | 725/87 |
| 2010/0095383 A1* | 4/2010 | Elazar | H04L 63/10 |
| | | | 726/26 |
| 2012/0036584 A1* | 2/2012 | Risan | G06F 21/10 |
| | | | 726/28 |
| 2017/0169235 A1* | 6/2017 | Schmelzer | H04L 63/12 |
| 2018/0082606 A1 | 3/2018 | Jones | |
| 2019/0251648 A1* | 8/2019 | Liu | G06F 16/27 |
| 2021/0326415 A1* | 10/2021 | Lyske | G06F 21/6209 |

\* cited by examiner

MUSIC SERVICE FOR THE DETECTION OF COPYRIGHT INFRINGEMENT

CROSS-REFERENCE TO RELATED APPLICATIONS

This application claims the benefit of priority of Provisional Patent Application 63/409,358 titled "MUSIC SERVICE FOR THE DETECTION OF COPYRIGHT INFRINGEMENT," filed on Sep. 23, 2022, the contents of which are incorporated by reference in their entirety.

BACKGROUND

Technical Field

The present invention relates, in general, to services for intellectual property protection, and, more particularly, but without limitation, to a music service for the detection of copyright infringement.

Music composition analysis and adjustment is known in the art.

U.S. Pat. No. 5,496,962 discloses a system for real-time music composition and synthesis.

U.S. Pat. No. 7,076,035 discloses methods for providing on-hold music using auto-composition.

U.S. Pat. No. 7,102,069 discloses systems and methods for creating, modifying, interacting with and playing musical compositions.

US 2018/0082606 discloses an apparatus to detect, analyze, record, and display audio data, and method thereof.

While there is software that is able to detect infringement of copyrighted music, people routinely alter the speed and pitch of copyrighted music as to avoid detection while on platforms such as YouTube.

However, none of the art addresses an automated process for detecting copyright infringement of music by transformative analysis of a song or video performance.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

SUMMARY

In an aspect of the disclosure, a system to detect an infringing audio composition is disclosed. The system includes at least one memory configured to store computer executable instructions; and at least one processor configured to execute the computer executable instructions to: receive an audio file from a user; prepare track samples based on the audio file to compare with audio files stored with a digital rights repository; determine an original audio recording from the digital rights repository; prepare an acapella version of the original audio recording and/or an instrumental version based on the original audio recording; process, by iteratively varying a pitch, a tempo and/or a key of, the versions to create a processed iteration of each version; automatically compare the processed iterations of the audio files stored with a digital rights repository; determine a match between the processed iterations and the audio files stored with the digital rights repository; and determine a digital rights action to take based on the match between the processed iteration of each of the versions.

In an aspect of the disclosure, a method to detect an infringing audio composition is disclosed. The method includes receiving an audio file from a user; preparing track samples based on the audio file to compare with audio files stored with a digital rights repository; determining an original audio recording from the digital rights repository; prepare an acapella version of the original audio recording and/or an instrumental version based on the original audio recording; processing, by iteratively varying a pitch, a tempo and/or a key of, the versions to create a processed iteration of each version; automatically comparing the processed iterations of the audio files stored with a digital rights repository; determining a match between the processed iterations and the audio files stored with the digital rights repository; and determining a digital rights action to take based on the match between the processed iteration of each of the versions.

In an aspect of the disclosure, a non-transitory computer readable medium is disclosed. The computer program product includes computer executable instructions stored thereon, which when executed by one or more processors, cause the one or more processors to detect an infringing audio composition. The computer program product includes computer executable instructions to: receive an audio file from a user; prepare track samples based on the audio file to compare with audio files stored with a digital rights repository; determine an original audio recording from the digital rights repository; prepare an acapella version of the original audio recording and/or an instrumental version based on the original audio recording; process, by iteratively varying a pitch, a tempo and/or a key of, the versions to create a processed iteration of each version; automatically compare the processed iterations of the audio files stored with a digital rights repository; determine a match between the processed iterations and the audio files stored with the digital rights repository; and determine a digital rights action to take based on the match between the processed iteration of each of the versions.

The foregoing summary is illustrative only and is not intended to be in any way limiting. In addition to the illustrative aspects, aspects, and features described above, further aspects, aspects, and features will become apparent by reference to the drawings and the following detailed description Other systems, methods, features, and advantages of the invention will be, or will become, apparent to one with skill in the art upon examination of the following FIGS. and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
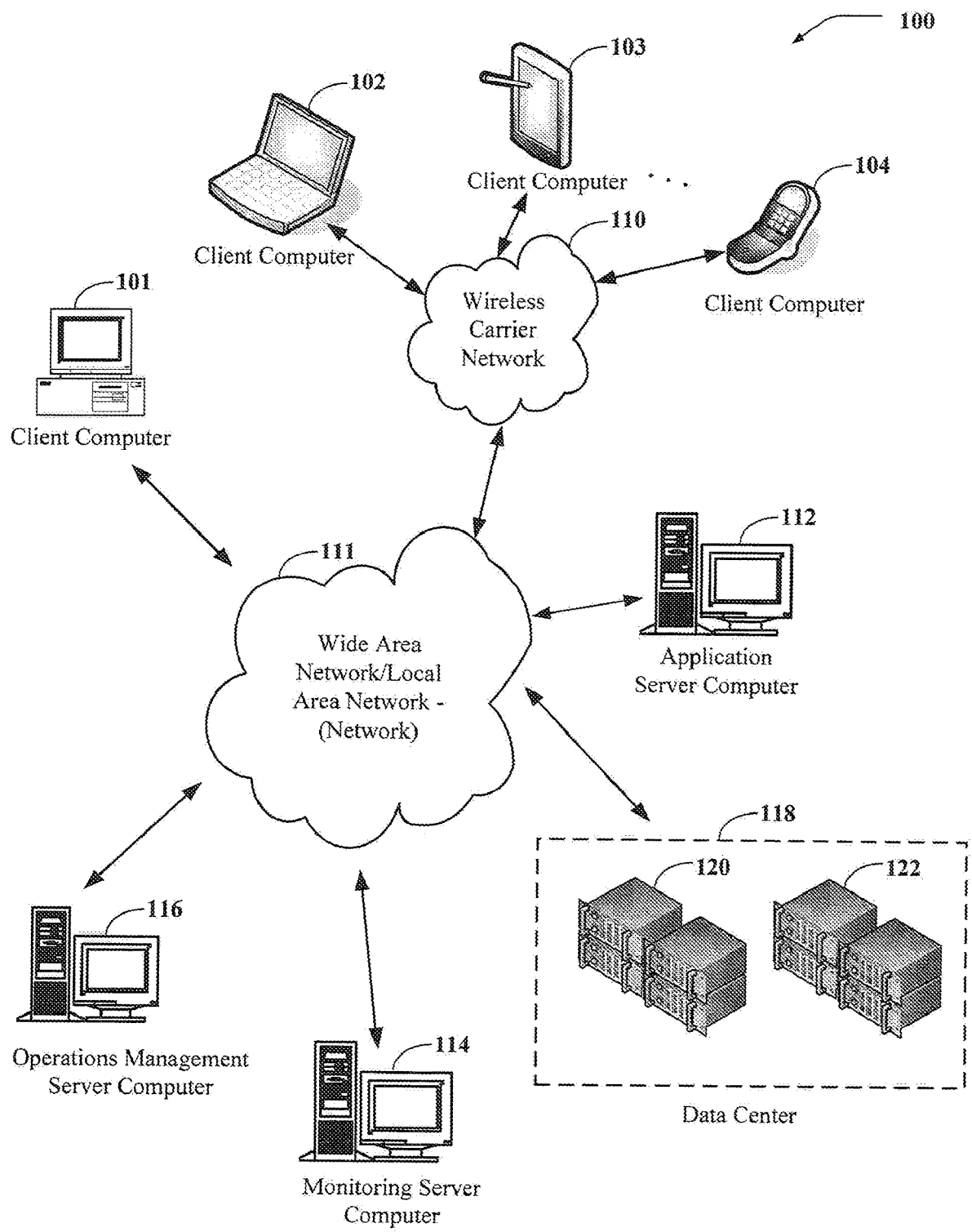
FIG. 1 shows components of one aspect of a computing environment for detecting infringement of an audio composition.

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

The elements in the Figures interoperate as explained in more detail below. Before setting forth the detail explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the display systems may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the architecture will be described, methods, systems, and articles of manufacture consistent with the architecture may include additional or different components. For example, a processor may be implemented as a microprocessor, microcontroller, application specific integrated circuit (ASIC), discrete logic, or a combination of other type of circuits or logic. Similarly, memories, may be DRAM, SRAM, Flash, or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

In the following description, numerous specific details are set forth to clearly describe various specific aspects disclosed herein. One skilled in the art, however, will understand that the presently claimed invention may be practiced without all of the specific details discussed below. In other instances, well known features have not been described so as not to obscure the invention. As described herein, the term "pivotally connected" shall be used to describe a situation wherein two or more identified objects are joined together in a manner that allows one or both of the objects to pivot, and/or rotate about or in relation to the other object in either a horizontal or vertical manner. As described herein, the term "removably coupled" and derivatives thereof shall be used to describe a situation wherein two or more objects are joined together in a non-permanent manner so as to allow the same objects to be repeatedly joined and separated. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. In addition, it should be understood that aspects of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one aspect, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify aspects of the invention and that other alternative mechanical configurations are possible.

According to some aspects, the presently disclosed system and/or method will take an original composed musical composition and make multiple incrementally adjusted versions by pitch, tempo and/or key of the original musical composition to be submitted to the copy of the Library of Congress, or Shazam or YouTube's music identification software. While there is software that is able to detect infringement of copyrighted music, people routinely alter the speed and pitch of copyrighted music as to avoid detection while on platforms such as YouTube. What this disclosed system does is expedite the process of taking copyrighted music and altering the pitch and speed of the music in such a way as to detect when someone has engaged in copyright infringement.

The process to manually alter a song to the most common ranges of tempos and pitches to detect infringement is a long and arduous process. The automation of this process saves extensive amounts of time and helps solve the problem of copyright infringement of digital music by quickly being able to detect clever infringers.

The following briefly describes the aspects of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

FIG. 1 shows components of one aspect of a computing environment 100 for detecting an infringing audio composition. Not all the components may be required to practice various aspects, and variations in the arrangement and type of the components may be made. As shown, the computing environment 100 includes local area networks (LANs)/wide area networks (WANs) (i.e., a network 111), a wireless network 110, client computers 101-104, an application server computer 112, a monitoring server computer 114, and an operations management server computer 116, which may be or may implement the disclosed infringement detection system.

Generally, the client computers 102-104 may include virtually any portable computing device capable of receiving and sending a message over a network, such as the network 111, the wireless network 110, or the like. The client computers 102-104 may also be described generally as client computers that are configured to be portable. Thus, the client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. Likewise, the client computers 102-104 may include Internet-of-Things (IOT) devices as well. Accordingly, the client computers 102-104 typically range widely in terms of capabilities and features. For example, a cell phone may have a numeric keypad and a few lines of monochrome Liquid Crystal Display (LCD) on which only text may be displayed. In another example, a mobile device may have a touch sensitive screen, a stylus, and several lines of color LCD in which both text and graphics may be displayed.

The client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one aspect, at least some of the client computers 102-104 may operate over wired and/or wireless network. Today, many of these devices include a capability to access and/or otherwise communicate over a network such as the network 111 and/or the wireless network 110. Moreover, the client computers 102-104 may access various computing applications, including a browser, or other web-based application.

In one aspect, one or more of the client computers 101-104 may be configured to operate within a business or other entity to perform a variety of services for the business or other entity. For example, a client of the client computers 101-104 may be configured to operate as a web server, an accounting server, a production server, an inventory server, or the like. However, the client computers 101-104 are not constrained to these services and may also be employed, for example, as an end-user computing node, in other aspects. Further, it should be recognized that more or less client computers may be included within a system such as described herein, and aspects are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one aspect, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one aspect, a user of the client computer may employ the browser application to perform various actions over a network.

The client computers 101-104 also may include at least one other client application that is configured to receive and/or send data, operations information, between another computing device. The client application may include a capability to provide requests and/or receive data relating to managing, operating, or configuring the operations management server computer 116.

The wireless network 110 can be configured to couple the client computers 102-104 with network 111. The wireless network 110 may include any of a variety of wireless sub-networks that may further overlay stand-alone ad-hoc networks, or the like, to provide an infrastructure-oriented connection for the client computers 102-104. Such sub-networks may include mesh networks, Wireless LAN (WLAN) networks, cellular networks, or the like.

The wireless network 110 may further include an autonomous system of terminals, gateways, routers, or the like connected by wireless radio links, or the like. These connectors may be configured to move freely and randomly and organize themselves arbitrarily, such that the topology of the wireless network 110 may change rapidly.

The wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as the client computers 102-104 with various degrees of mobility. For example, the wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, the wireless network 110 may include virtually any wireless communication mechanism by which information may travel between the client computers 102-104 and another computing device, network, or the like.

The network 111 can be configured to couple network devices with other computing devices, including, the operations management server computer 116, the monitoring server computer 114, the application server computer 112, the client computer 101, and through the wireless network 110 to the client computers 102-104. The network 111 can be enabled to employ any form of computer readable media for communicating information from one electronic device to another. Also, the network 111 can include the internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within the network 111 and the wireless network 110. Furthermore, remote computers and other related electronic devices could be remotely connected to either LANs or WANs via a modem and temporary telephone link. In essence, the network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
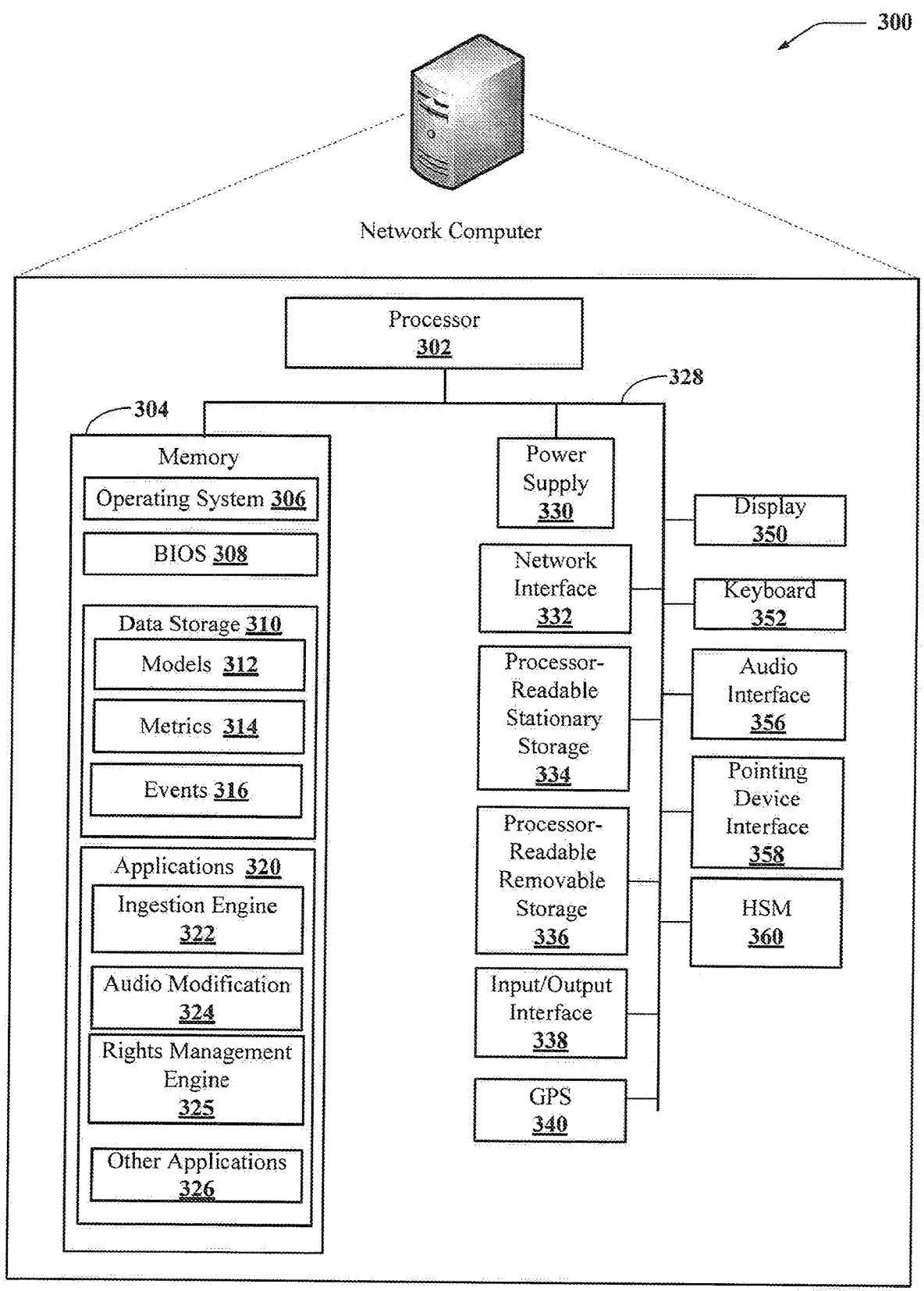
FIG. 3 shows one aspect of a network computer that may at least partially implement one of the various aspects for detecting infringement of an audio composition.

The operations management server computer 116 may include virtually any network computer usable to provide computer operations management services, such as a network computer, as described with respect to FIG. 3. In one aspect, the operations management server computer 116 employs various techniques for managing the operations of computer operations, networking performance, customer service, customer support, resource schedules and notification policies, event management, or the like. Also, the operations management server computer 116 may be arranged to interface/integrate with one or more external systems such as telephony carriers, email systems, web services, or the like, to perform computer operations management. Further, the operations management server computer 116 may obtain various events and/or performance metrics collected by other systems, such as, the monitoring server computer 114.

In at least one of the various aspects, the monitoring server computer 114 represents various computers that may be arranged to monitor the performance of computer operations for an entity (e.g., company or enterprise). For example, the monitoring server computer 114 may be arranged to monitor whether applications/systems are operational, network performance, trouble tickets and/or their resolution, or the like. In some aspects, one or more of the functions of the monitoring server computer 114 may be performed by the operations management server computer 116.

Devices that may operate as the operations management server computer 116 include various network computers, including, but not limited to personal computers, desktop computers, multiprocessor systems, microprocessor-based or programmable consumer electronics, network PCs, server devices, network appliances, or the like. It should be noted that while the operations management server computer 116 is illustrated as a single network computer, the invention is not so limited. Thus, the operations management server computer 116 may represent a plurality of network computers. For example, in one aspect, the operations management server computer 116 may be distributed over a plurality of network computers and/or implemented using cloud architecture.

Moreover, the operations management server computer 116 is not limited to a particular configuration. Thus, the operations management server computer 116 may operate using a master/slave approach over a plurality of network computers, within a cluster, a peer-to-peer architecture, and/or any of a variety of other architectures.

In some aspects, one or more data centers, such as a data center 118, may be communicatively coupled to the wireless network 110 and/or the network 111. In at least one of the various aspects, the data center 118 may be a portion of a private data center, public data center, public cloud environment, or private cloud environment. In some aspects, the data center 118 may be a server room/data center that is physically under the control of an organization. The data center 118 may include one or more enclosures of network computers, such as, an enclosure 120 and an enclosure 122.

The enclosure 120 and the enclosure 122 may be enclosures (e.g., racks, cabinets, or the like) of network computers and/or blade servers in the data center 118. In some aspects, the enclosure 120 and the enclosure 122 may be arranged to include one or more network computers arranged to operate as operations management server computers, monitoring server computers (e.g., the operations management server computer 116, the monitoring server computer 114, or the like), storage computers, or the like, or combination thereof. Further, one or more cloud instances may be operative on one or more network computers included in the enclosure 120 and the enclosure 122.

The data center 118 may also include one or more public or private cloud networks. Accordingly, the data center 118 may comprise multiple physical network computers, interconnected by one or more networks, such as, networks similar to and/or the including network 111 and/or wireless network 110. The data center 118 may enable and/or provide one or more cloud instances (not shown). The number and composition of cloud instances may be vary depending on the demands of individual users, cloud network arrangement, operational loads, performance considerations, application needs, operational policy, or the like. In at least one of the various aspects, the data center 118 may be arranged as a hybrid network that includes a combination of hardware resources, private cloud resources, public cloud resources, or the like.

As such, the operations management server computer 116 is not to be construed as being limited to a single environment, and other configurations, and architectures are also contemplated. The operations management server computer 116 may employ processes such as described below in conjunction with at least some of the figures discussed below to perform at least some of its actions.

Figure 2:
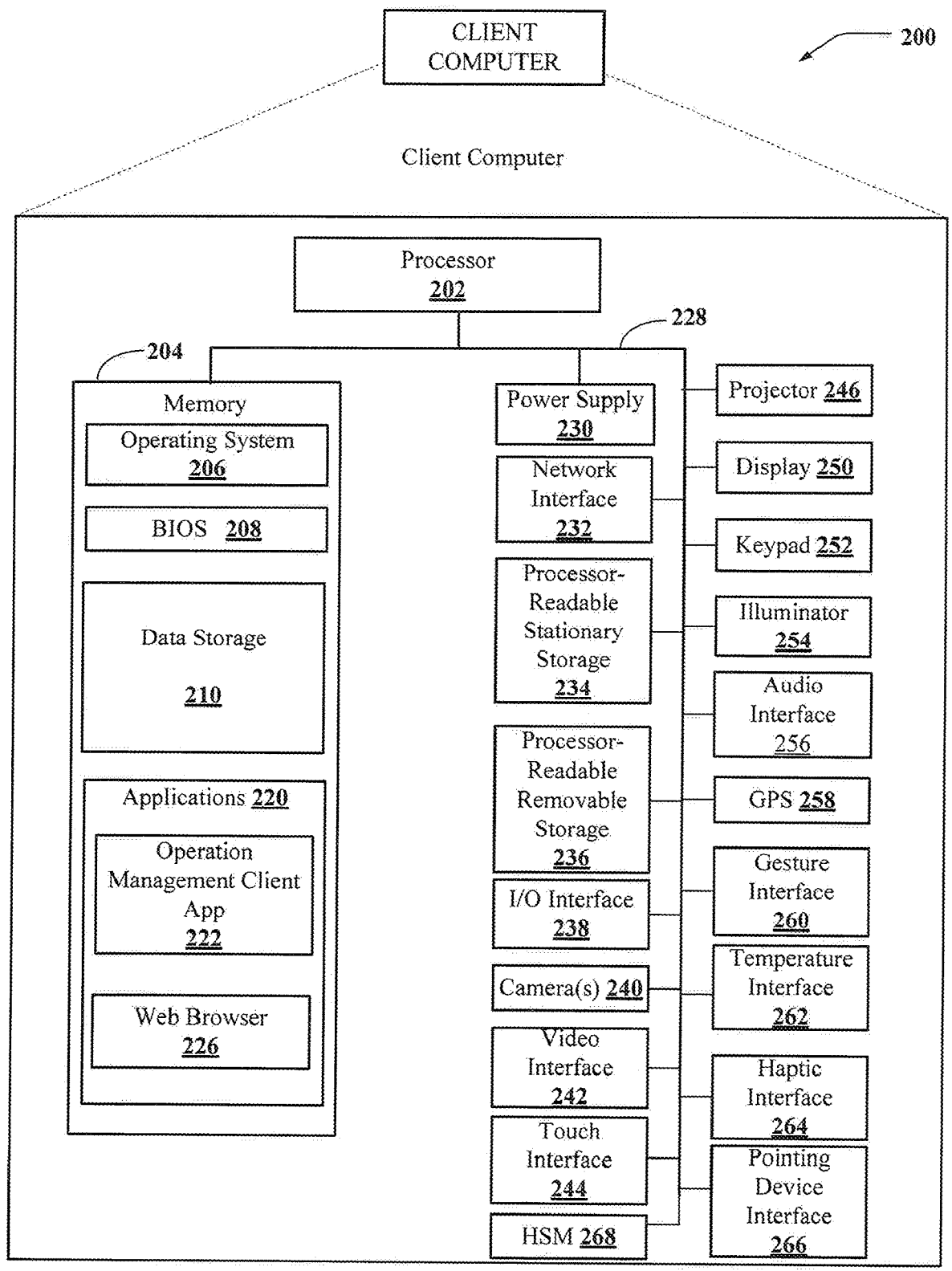
FIG. 2 shows one aspect of a client computer for detecting infringement of an audio composition.

FIG. 2 shows one aspect of a client computer 200. The client computer 200 may include more or less components than those shown in FIG. 2. The client computer 200 may represent, for example, at least one aspect of mobile computers or client computers shown in FIG. 1.

The client computer 200 may include a processor 202 in communication with a memory 204 via a bus 228. The client computer 200 may also include a power supply 230, a network interface 232, an audio interface 256, a display 250, a keypad 252, an illuminator 254, a video interface 242, an input/output interface (i.e., an I/O interface 238), a haptic interface 264, a global positioning systems (GPS) receiver 258, an open air gesture interface 260, a temperature interface 262, a camera 240, a projector 246, a pointing device interface 266, a processor-readable stationary storage device 234, and a non-transitory processor-readable removable storage device 236. The client computer 200 may optionally communicate with a base station (not shown), or directly with another computer. And in one aspect, although not shown, a gyroscope may be employed within the client computer 200 to measuring or maintaining an orientation of the client computer 200.

The power supply 230 may provide power to the client computer 200. A rechargeable or non-rechargeable battery may be used to provide power. The power may also be provided by an external power source, such as an AC adapter or a powered docking cradle that supplements or recharges the battery.

The network interface 232 includes circuitry for coupling the client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MIMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. The network interface 232 is sometimes known as a transceiver, transceiving device, or network interface card (NIC).

The audio interface 256 may be arranged to produce and receive audio signals such as the sound of a human voice. For example, the audio interface 256 may be coupled to a speaker and microphone (not shown) to enable telecommunication with others or generate an audio acknowledgement for some action. A microphone in the audio interface 256 can also be used for input to or control of the client computer 200, e.g., using voice recognition, detecting touch based on sound, and the like.

The display 250 may be a liquid crystal display (LCD), gas plasma, electronic ink, light emitting diode (LED), Organic LED (OLED) or any other type of light reflective or light transmissive display that can be used with a computer. The display 250 may also include a touch interface 244 arranged to receive input from an object such as a stylus or a digit from a human hand, and may use resistive, capacitive, surface acoustic wave (SAW), infrared, radar, or other technologies to sense touch or gestures.

[1] The projector 246 may be a remote handheld projector or an integrated projector that is capable of projecting an image on a remote wall or any other reflective object such as a remote screen.

The video interface 242 may be arranged to capture video images, such as a still photo, a video segment, an infrared video, or the like. For example, the video interface 242 may be coupled to a digital video camera, a web-camera, or the like. The video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

The keypad 252 may comprise any input device arranged to receive input from a user. For example, the keypad 252 may include a push button numeric dial, or a keyboard. The keypad 252 may also include command buttons that are associated with selecting and sending images.

The illuminator 254 may provide a status indication or provide light. The illuminator 254 may remain active for specific periods of time or in response to event messages. For example, when the illuminator 254 is active, it may backlight the buttons on the keypad 252 and stay on while the client computer is powered. Also, the illuminator 254 may backlight these buttons in various patterns when particular actions are performed, such as dialing another client computer. The illuminator 254 may also cause light sources positioned within a transparent or translucent case of the client computer to illuminate in response to actions.

Further, the client computer 200 may also comprise a hardware security module (i.e., an HSM 268) for providing additional tamper resistant safeguards for generating, storing or using security/cryptographic information such as, keys, digital certificates, passwords, passphrases, two-factor authentication information, or the like. In some aspects, hardware security module may be employed to support one or more standard public key infrastructures (PKI), and may be employed to generate, manage, or store keys pairs, or the like. In some aspects, the HSM 268 may be a stand-alone computer, in other cases, the HSM 268 may be arranged as a hardware card that may be added to a client computer.

The I/O 238 can be used for communicating with external peripheral devices or other computers such as other client computers and network computers. The peripheral devices may include an audio headset, display screen glasses, remote speaker system, remote speaker and microphone system, and the like. The I/O interface 238 can utilize one or more technologies, such as Universal Serial Bus (USB), Infrared, WiFi, WiMax, Bluetooth™, and the like.

The I/O interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the client computer 200.

The haptic interface 264 may be arranged to provide tactile feedback to a user of the client computer. For example, the haptic interface 264 may be employed to vibrate the client computer 200 in a particular way when another user of a computer is calling. The temperature interface 262 may be used to provide a temperature measurement input or a temperature changing output to a user of the client computer 200. The open air gesture interface 260 may sense physical gestures of a user of the client computer 200, for example, by using single or stereo video cameras, radar, a gyroscopic sensor inside a computer held or worn by the user, or the like. The camera 240 may be used to track physical eye movements of a user of the client computer 200.

The GPS transceiver 258 can determine the physical coordinates of the client computer 200 on the surface of the earth, which typically outputs a location as latitude and longitude values. The GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the client computer 200 on the surface of the earth. It is understood that under different conditions, the GPS transceiver 258 can determine a physical location for the client computer 200. In at least one aspect, however, the client computer 200 may, through other components, provide other information that may be employed to determine a physical location of the client computer, including for example, a Media Access Control (MAC) address, IP address, and the like.

Human interface components can be peripheral devices that are physically separate from the client computer 200, allowing for remote input or output to the client computer 200. For example, information routed as described here through human interface components such as the display 250 or the keypad 252 can instead be routed through the network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Bluetooth LE, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include a web browser application 226 that is configured to receive and to send web pages, web-based messages, graphics, text, multimedia, and the like. The client computer's browser application may employ virtually any programming language, including a wireless application protocol messages (WAP), and the like. In at least one aspect, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

The memory 204 may include RAM, ROM, or other types of memory. The memory 204 illustrates an example of computer-readable storage media (devices) for storage of information such as computer-readable instructions, data structures, program modules or other data. The memory 204 may store a BIOS 208 for controlling low-level operation of the client computer 200. The memory may also store an operating system 206 for controlling the operation of the client computer 200. It will be appreciated that this component may include a general-purpose operating system such as a version of UNIX, or LINUX™, or a specialized client computer communication operating system such as Windows Phone™, or IOS® operating system. The operating system may include, or interface with, a Java virtual machine module that enables control of hardware components or operating system operations via Java application programs.

The memory 204 may further include one or more data storage 210, which can be utilized by the client computer 200 to store, among other things, the applications 220 or other data. For example, the data storage 210 may also be employed to store information that describes various capabilities of the client computer 200. The information may then be provided to another device or computer based on any of a variety of methods, including being sent as part of a header during a communication, sent upon request, or the like. The data storage 210 may also be employed to store social networking information including address books, buddy lists, aliases, user profile information, or the like. The data storage 210 may further include program code, data, algorithms, and the like, for use by a processor, such as the processor 202 to execute and perform actions. In one aspect, at least some of the data storage 210 might also be stored on another component of the client computer 200, including, but not limited to, the non-transitory processor-readable removable storage device 236, the processor-readable stationary storage device 234, or external to the client computer.

The applications 220 may include computer executable instructions which, when executed by the client computer 200, transmit, receive, or otherwise process instructions and data. The applications 220 may include, for example, an operations management client application 222. In at least one of the various aspects, the operations management client application 222 may be used to exchange communications to and from the operations management server computer 116 of FIG. 1, the monitoring server computer 114 of FIG. 1, the application server computer 112 of FIG. 1, or the like. Exchanged communications may include, but are not limited to, queries, searches, messages, notification messages, events, alerts, performance metrics, log data, API calls, or the like, combination thereof.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more aspects (not shown in the figures), the client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more aspects (not shown in the figures), the client computer 200 may include a hardware microcontroller instead of a CPU. In at least one aspect, the microcontroller may directly execute its own embedded logic to perform actions and access its own internal memory and its own external Input and Output Interfaces (e.g., hardware pins or wireless transceivers) to perform actions, such as System On a Chip (SOC), or the like.

FIG. 3 shows one aspect of network computer 300 that may at least partially implement one of the various aspects. The network computer 300 may include more or fewer components than those shown in FIG. 3. The network computer 300 may represent, for example, one aspect of at least one audio composition infringement detection system according to the disclosure, such as the operations management server computer 116 of FIG. 1, the monitoring server computer 114 of FIG. 1, or an application server computer 112 of FIG. 1. Further, in some aspects, the network computer 300 may represent one or more network computers included in a data center, such as, the data center 118, the enclosure 120, the enclosure 122, or the like.

As shown in the FIG. 3, the network computer 300 includes a processor 302 in communication with a memory 304 via a bus 328. The network computer 300 also includes a power supply 330, a network interface 332, an audio interface 356, a display 350, a keyboard 352, an input/output interface (i.e., an I/O interface 338), a processor-readable stationary storage device 334, and a processor-readable removable storage device 336. The power supply 330 provides power to the network computer 300.

The network interface 332 includes circuitry for coupling the network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. The network interface 332 is sometimes known as a transceiver, transceiving device, or network interface card (NIC). The network computer 300 may optionally communicate with a base station (not shown), or directly with another computer.

The audio interface 356 is arranged to produce and receive audio signals such as the sound of a human voice. For example, the audio interface 356 may be coupled to a speaker and microphone (not shown) to enable telecommunication with others or generate an audio acknowledgement for some action. A microphone in the audio interface 356 can also be used for input to or control of the network computer 300, for example, using voice recognition.

The display 350 may be a liquid crystal display (LCD), gas plasma, electronic ink, light emitting diode (LED), Organic LED (OLED) or any other type of light reflective or light transmissive display that can be used with a computer. The display 350 may be a handheld projector or pico projector capable of projecting an image on a wall or other object.

The network computer 300 may also comprise the I/O interface 338 for communicating with external devices or computers not shown in FIG. 3. The I/O interface 338 can utilize one or more wired or wireless communication technologies, such as USB™ Firewire™, WiFi, WiMax, Thunderbolt™, Infrared, Bluetooth™, Zigbee™, serial port, parallel port, and the like.

Also, the I/O interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to the network computer 300. Human interface components can be physically separate from network computer 300, allowing for remote input or output to the network computer 300. For example, information routed as described here through human interface components such as the display 350 or the keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through a pointing device interface 358 to receive user input.

A GPS transceiver 340 can determine the physical coordinates of network computer 300 on the surface of the Earth, which typically outputs a location as latitude and longitude values. The GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of the network computer 300 on the surface of the Earth. It is understood that under different conditions, the GPS transceiver 340 can determine a physical location for the network computer 300. In at least one aspect, however, the network computer 300 may, through other components, provide other information that may be employed to determine a physical location of the client computer, including for example, a Media Access Control (MAC) address, IP address, and the like.

The memory 304 may include Random Access Memory (RAM), Read-Only Memory (ROM), or other types of memory. The memory 304 illustrates an example of computer-readable storage media (devices) for storage of information such as computer-readable instructions, data structures, program modules or other data. The memory 304 stores a basic input/output system (i.e., a BIOS 308) for controlling low-level operation of the network computer 300. The memory also stores an operating system 306 for controlling the operation of the network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

The memory 304 may further include a data storage 310, which can be utilized by the network computer 300 to store, among other things, applications 320 or other data. For example, the data storage 310 may also be employed to store information that describes various capabilities of the network computer 300. The information may then be provided to another device or computer based on any of a variety of methods, including being sent as part of a header during a communication, sent upon request, or the like. The data storage 310 may also be employed to store social networking information including address books, buddy lists, aliases, user profile information, or the like. The data storage 310 may further include program code, instructions, data, algorithms, and the like, for use by a processor, such as the processor 302 to execute and perform actions such as those actions described below. In one aspect, at least some of the data storage 310 might also be stored on another component of the network computer 300, including, but not limited to, the non-transitory media inside processor-readable removable storage device 336, the processor-readable stationary storage device 334, or any other computer-readable storage device within the network computer 300 or external to network computer 300. The data storage 310 may include, for example, models 312, operations metrics 314, events 316, or the like.

The applications 320 may include computer executable instructions which, when executed by the network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. The applications 320 may include an ingestion engine 322, a resolution tracker engine 324, an event-completion tracker engine 325, a transiency prediction engine 326, other applications 327. In at least one of the various aspects, one or more of the applications may be implemented as modules or components of another application. Further, in at least one of the various aspects, applications may be implemented as operating system extensions, modules, plugins, or the like.

Furthermore, in at least one of the various aspects, the ingestion engine 322 for receiving audio files, the audio modification engine 324, the right management engine 325 for determining digital rights actions based on detecting copyright infringement of audio files, and/or other applications 326, or the like, may be operative in a cloud-based computing environment. In at least one of the various aspects, these applications, and others, that comprise the management platform may be executing within virtual machines or virtual servers that may be managed in a cloud-based based computing environment. In at least one of the various aspects, in this context the applications may flow from one physical network computer within the cloud-based environment to another depending on performance and scaling considerations automatically managed by the cloud computing environment. Likewise, in at least one of the various aspects, virtual machines or virtual servers dedicated to the ingestion engine 322, the ingestion engine 322 for receiving audio files, the audio modification engine 324, the right management engine 325 for determining digital rights actions based on detecting copyright infringement of audio files, and/or the other applications 326, may be provisioned and de-commissioned automatically.

In at least one of the various aspects, the applications may be arranged to employ geo-location information to select one or more localization features, such as, time zones, languages, currencies, calendar formatting, or the like. Localization features may be used in user-interfaces and well as internal processes or databases. Further, in some aspects, localization features may include information regarding culturally significant events or customs which may provide a source of audio compositions for evaluation (e.g., concerts, performances, local holidays, political events, or the like). In at least one of the various aspects, geo-location information used for selecting localization information may be provided by the GPS transceiver 340. Also, in some aspects, geolocation information may include information providing using one or more geolocation protocol over the networks, such as, the wireless network 108 or the network 111.

Also, in at least one of the various aspects, the ingestion engine 322, the ingestion engine 322 for receiving audio files, the audio modification engine 324, the right management engine 325 for determining digital rights actions based on detecting copyright infringement of audio files, and/or the other applications 326, or the like, may be located in virtual servers running in a cloud-based computing environment rather than being tied to one or more specific physical network computers.

Further, the network computer 300 may also comprise hardware security module (i.e., an HSM 360) for providing additional tamper resistant safeguards for generating, storing or using security/cryptographic information such as, keys, digital certificates, passwords, passphrases, two-factor authentication information, or the like. In some aspects, hardware security module may be employed to support one or more standard public key infrastructures (PKI), and may be employed to generate, manage, or store keys pairs, or the like. In some aspects, the HSM 360 may be a stand-alone network computer, in other cases, the HSM 360 may be arranged as a hardware card that may be installed in a network computer.

Additionally, in one or more aspects (not shown in the figures), the network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more aspects (not shown in the figures), the network computer may include a hardware microcontroller instead of a CPU. In at least one aspect, the microcontroller may directly execute its own embedded logic to perform actions and access its own internal memory and its own external Input and Output Interfaces (e.g., hardware pins or wireless transceivers) to perform actions, such as System On a Chip (SOC), or the like.

Figure 4:
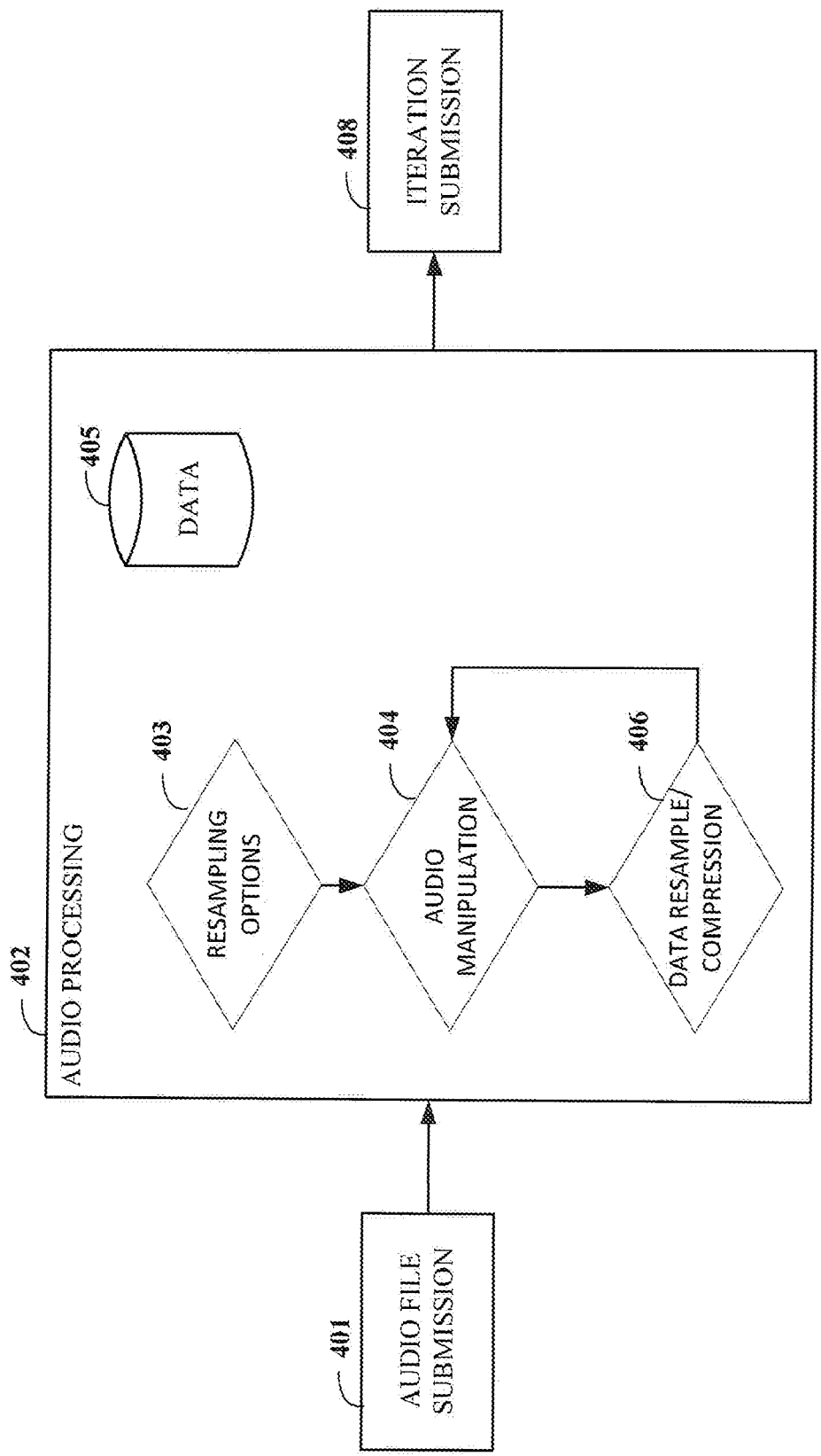
FIG. 4 illustrates an exemplary block diagram of a system for detecting an infringing audio composition, according to an aspect of the disclosure.

FIG. 4 illustrates an exemplary block diagram of a system for detecting an infringing audio composition, according to an aspect of the disclosure. The system includes an audio file submission or ingestion engine 401, where a digital music file, such as an original audio recording submitted by a user, is provided to the system. The audio file is transferred to the audio processing engine 402. At an audio resampling options engine 403, the system may select sampling/resampling options for processing the audio, either through pre-selected options or user-selected options.

An audio manipulation engine 404 may be used to adjust and/or modify pitch, tempo, and/or key of the digital audio music file. An example process flow for the audio manipulation engine 404 is described herein. The system may evaluate an original audio recording of the input digital music file, an instrumental version of the input digital music file and an acapella version of the input digital music file. The instrumental version and the acapella version may be created from the original audio recording using conventional audio processing techniques known to one of skill in the art, using digital audio sampling and/or manipulation of the original audio recording.

In an aspect, the system may manipulate the original audio recording, acapella version and/or instrumental version of the input digital music file or audio composition by changing a pitch of the original audio recording, by a number of pitch steps by slowing down or speeding up the original audio recording. A key and a tempo of the original audio recording will rise together, incrementally to create a number of altered pitch versions, or processed iterations, corresponding to the pitch steps, of the original audio recording, acapella version and/or instrumental version in one direction (such as a higher pitch) and a second number of altered pitch versions in another direction (such as a lower pitch). The number of altered pitch versions or processed iterations may be selected as desired by the user of the software of the disclosed system for convenience and manageability of computation. In an aspect, the number of altered pitch versions or processed iterations may be 10 in each direction. As the pitch changes, the key of the original audio recording, acapella version and/or instrumental version will change together with the tempo of the original audio recording.

In an aspect of the disclosure, the system, through the audio manipulation engine 404, may manipulate the original audio recording, acapella version and/or instrumental version of the input digital music file by changing a key of the original audio recording, while keeping the tempo of the original audio recording the same. The key will be incremented higher in one direction by key steps, then decremented lower in another direction by key steps. Each increment will be an altered key version or processed iteration of the original audio recording, acapella version and/or instrumental version. In an aspect, the system will create 12 altered key versions in one key direction (corresponding to an octave) and 12 altered key versions in a second key direction.

In an aspect, the system, through the audio manipulation engine 404, may manipulate the original audio recording, acapella version and/or instrumental version of the input digital music file by changing a tempo of the original audio recording, while keeping the key of the original audio recording the same key. The system may increase the tempo incrementally in a first number of tempo steps and decrease the tempo incrementally in a second number of tempo steps. In an aspect, the first number of steps may be the same as the second number of steps. In an aspect, both the first number of steps and the second number of steps may be 10 steps each. In another aspect, the first number of steps is different from the second number of steps.

In an aspect, the system, through the audio manipulation engine 404, may incrementally change the key of the original audio recording, acapella version and/or instrumental version by a key step or note, and then adjust the tempo of the original audio recording in a tempo slide as the tempo slows down and speeds up in a number of tempo steps each direction. The system will then change the pitch again to a next key, and repeat the tempo slide, such that each key version, a number of key steps up and a second number of key steps down, there may be a corresponding number of tempo slide levels. In an aspect, the system may create 12 key up steps and 12 key down steps, with 10 versions of the tempo rising and falling each directions to 20 different versions of 24 different keys.

A database 405 may be operatively connected to the audio processing engine 402. The database 405 may be contained within the audio processing engine 402, located remotely from the audio processing engine 402 or may be a distributed database across a network and connected devices. The database 405 may store audio files, digital rights management files and software code, audio and digital signal processing code and parameters/options for sampling, compression and other digital processing techniques, audio recording repositories, etc. The database 405 may also store the rendered digital audio tracks. In an aspect of the disclosure, the database 405 may save iterations using GPL and/or FOS software libraries.

During audio manipulation, the system may also determine updated resampling options and/or compression options through a data resample/compression engine 406. The options from data resample/compression engine 406, either input by a user or provided based on the audio file data, or drawn from the database 405, may be fed back into the audio manipulation engine for additional processing or evaluation of processed iterations of the original audio recording, the acapella version and/or the instrumental version. In an aspect, the system may dedicate additional processing power (CPU cycles) to introduce speed enhancements for the audio manipulation engine 404.

For each version or iteration, the system will then evaluate a pitch and a tempo of the version. In an aspect, the processed iteration is sampled and submitted to an iteration submission engine 408 to automatically search for an original version or an oldest known published version, from one or more music identification software services or digital rights repository (such as YouTube, Shazam, the Library of Congress, the Mechanical Licensing Collective (MLC) or other digital rights services or entities) to compare the one or more digital audio tracks with different processed iterations to one or more existing digital music files. According to some aspects, if the comparison makes a match, the one or more music identification software services may identify the match as possible infringement.

Figure 5:
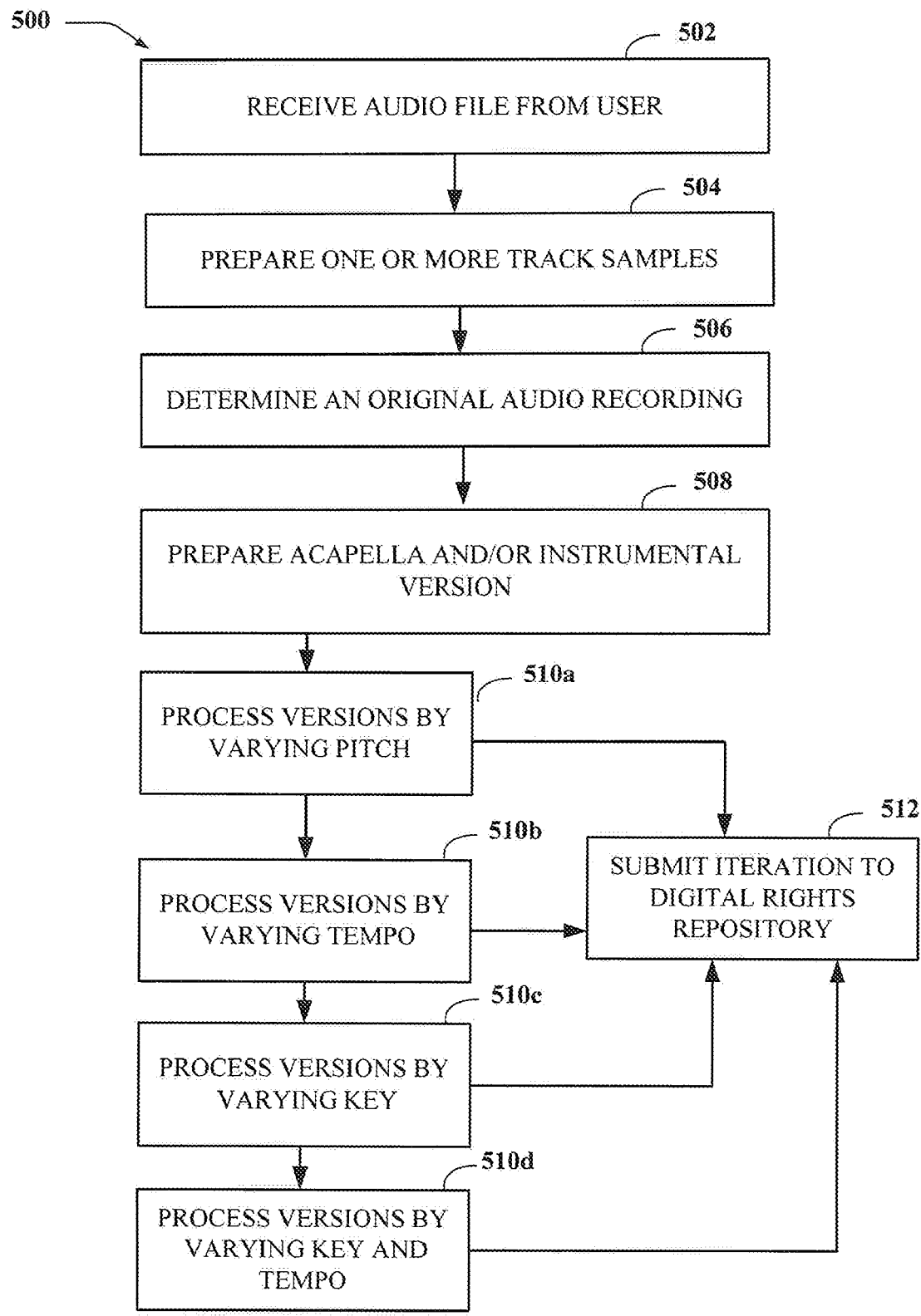
FIG. 5 illustrates a flowchart for acts taken in an exemplary method for detecting copyright infringement, according to an aspect of the disclosure.

FIG. 5 illustrates a flowchart 500 for acts taken in an exemplary method for detecting an infringed audio composition. FIG. 5 is explained in conjunction with FIG. 1 to FIG. 4. The control starts at act 502.

At act 502, the system receives and/or ingests an audio file from a user. The user may be a member of, a client of or registered with a digital rights enforcement service or entity that makes use of the disclosed system to detect a copyright infringed audio composition. In an aspect, the audio file may an original audio recording, live performance, recorded performance or other types of audio files known in the art. The audio file may be of an MPG, WAV, FLAC, OOG or other audio file formats known to one of skill in the art. The audio file may be compressed with lossy or lossless compression. In an aspect, the audio file may be later manipulated and/or processed with compression routines to allow more options for a user and the system to process the audio file, including resampling options.

At act 504, the system may prepare one or more track samples based on the received audio file to compare with one or more audio files stored with a digital rights repository, such as Shazam, YouTube, the Library of Congress or other digital music and digital rights repositories. The system may create a number of track samples (20) for comparison against the digital rights repository. In an aspect, the number of track samples may be approximately 20. In an aspect, each separate track is individually run against a service such as Shazam (https://github.com/dotX12/ShazamIO) with a definable search query of release date, match percentage, lyrics and/or instrumental renditions.

At act 506, the system determines an original audio recording from the digital rights repository based on the one or more track samples.

At act 508, the system prepares an acapella version based on the original audio recording and/or an instrumental version based on the original audio recording.

At acts 510a-510d, the system processes, by iteratively varying a pitch (act 510a), a tempo (act 510b) and/or a key (510c), and/or a key and tempo at the same time (act 510d) of, the original audio recording, the acapella version and/or the instrumental version to create a processed iteration of each of the original audio recording, the acapella version and/or the instrumental version. In an aspect, the system may iteratively vary the pitch of the original audio recording, the acapella version and/or the instrumental version by a number of pitch steps. In an aspect, the number of pitch steps may be 10 steps in both directions of key In an aspect, the system may iteratively vary the tempo of the original audio recording, the acapella version and/or the instrumental version by a number of tempo steps. In an aspect, the number of tempo steps may be 10 steps in both directions of tempo speed. In an aspect, the system may iteratively vary the key of the original audio recording, the acapella version and/or the instrumental version by a number of key steps. In an aspect, the number of key steps may be 12 steps in both directions of key. In an aspect, the system would incrementally change the key by a note, and then do a tempo slide of that song as the tempo slows down and speeds up 10 different versions of each way (act 510d). Then, the system would change the pitch again to the next key, and do the same thing with the tempo. Essentially, at each key 12 up and 12 down there would be 10 versions of the tempo rising and falling each directions to 20 different versions of 24 different keys.

In an aspect, during audio manipulation, the system may also determine updated resampling options and/or compression options through the data resample/compression engine 406. The options from data resample/compression engine 406, either input by a user or provided based on the audio file data, or drawn from the database 405, may be fed back into the audio manipulation engine for additional processing or evaluation of processed iterations of the original audio recording, the acapella version and/or the instrumental version.

Figure 6:
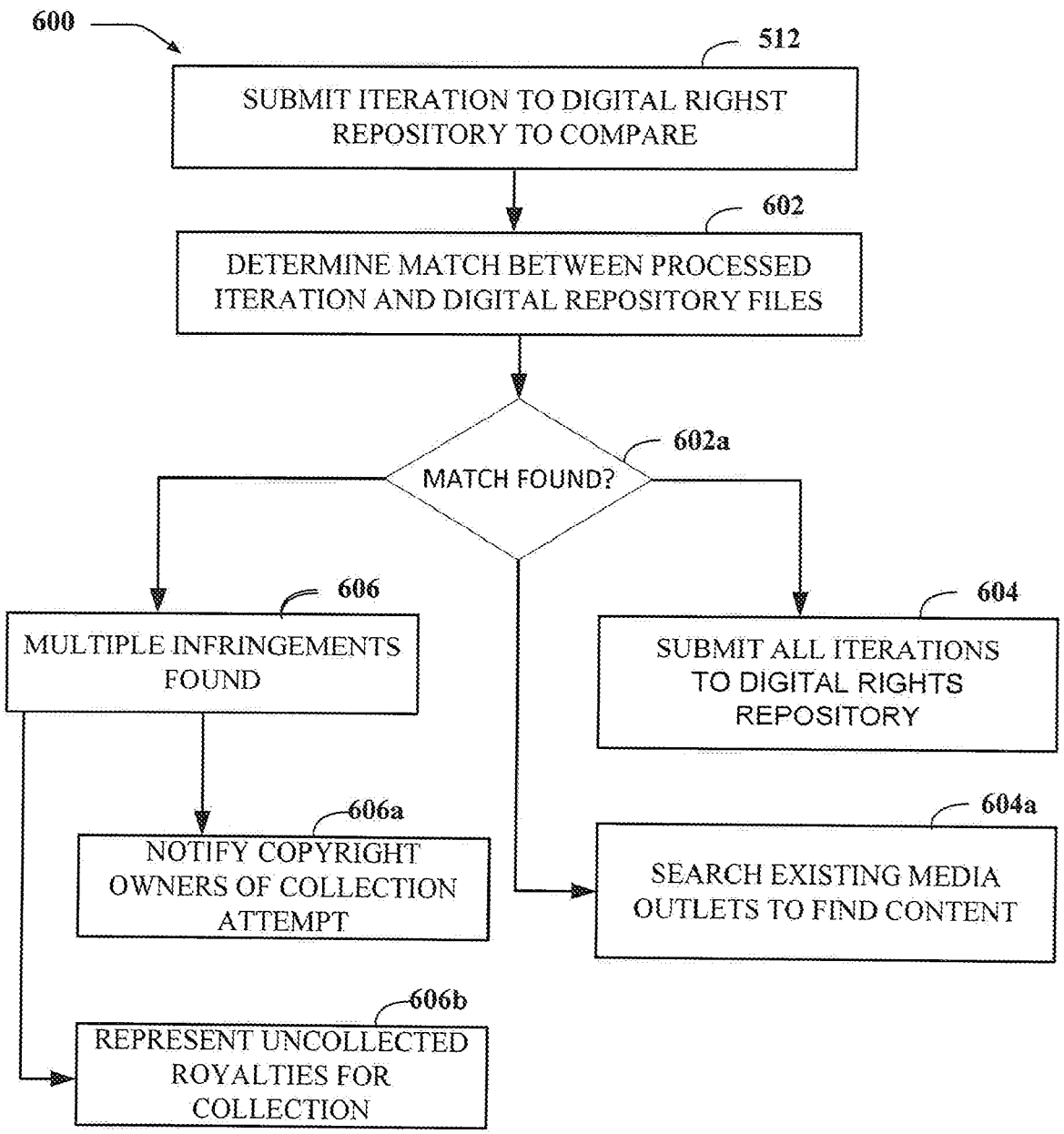
FIG. 6 illustrates a flowchart for acts taken in an exemplary method for detecting an infringed audio composition.

At act 512, the system will automatically submit each processed iteration of the audio compositions to compare the processed iteration of each of the original audio recording, the acapella version and/or the instrumental version with the one or more audio files stored with a digital rights repository. The automatic submission of each iteration reduces the computational load of uploading the entire set of processed iterations to a digital rights repository such as Shazam or YouTube music identification to determine a match by comparison between the processed iterations and the audio files stored in the digital rights repository. In an aspect, for each version or iteration, the system will then evaluate a pitch and a tempo of the version. In an aspect, the processed iteration is sampled and submitted to an iteration submission engine 408 to automatically search for an original version or an oldest known published version, from one or more music identification software services or digital rights repository (such as YouTube, Shazam, the Library of Congress, the Mechanical Licensing Collective (MLC) or other digital rights services or entities) to compare the one or more digital audio tracks with different processed iterations to one or more existing digital music files. According to some aspects, if the comparison makes a match, the one or more music identification software services may identify the match as possible infringement FIG. 6 illustrates a flowchart 600 for acts taken in an exemplary method for detecting an infringed audio composition continuing from the acts illustrated in FIG. 5. Processing begins at act 512.

At act 602, the system determines if a match between the processed iteration of each of the original audio recording, the acapella version and/or the instrumental version and the one or more audio files stored with the digital rights repository exists. The system may determine the match by determining one or more copyright infringing matches based on the one or more audio files stored with the digital rights repository.

At act 602a, the system determines, based on the match, what responses to take as a digital rights action to preserve intellectual property protection and enforcement of copyrighted material such as the original audio recording or audio composition. The system determines a digital rights action to take based on the match between the processed iteration of each of the original audio recording, the acapella version and/or the instrumental version and the one or more audio files stored with the digital rights repository.

At act 604, the system may determine the digital rights action by, responsive to determining there is no match between the processed iteration of each of the original audio recording, the acapella version and/or the instrumental version and the one or more audio files stored with the digital rights repository, automatically submitting all or a portion of the processed iterations of each of the original audio recording, the acapella version and/or the instrumental version for registration with a digital rights agency, such as the Library of Congress, MLC or other digital copyright services and entities, for registration with these entities or services.

At act 604a, if no match is determined at act 602, the system may also search a media outlet for a match to the processed iteration of each of the original audio recording, the acapella version and/or the instrumental version. The system may use the unmatched iterations to protect original content from a missed content ID match.

At act 606, the system determines that multiple infringing audio compositions have been detected. Each infringement of a processed iteration of the original audio recording, the acapella version and/or the instrumental version is accounted for.

At act 606a, the system may determine the digital rights action by, responsive to determining there is more than one match between the processed iteration of each of the original audio recording, the acapella version and/or the instrumental version and the one or more audio files stored with the digital rights repository (multiple infringements), notifying a digital rights (copyright) holder of a royalty collection.

At act 606b, the system may determine the digital rights action by, responsive to determining there is more than one match between the processed iteration of each of the original audio recording, the acapella version and/or the instrumental version and the one or more audio files stored with the digital rights repository (multiple infringements), representing uncollected royalties for collection. In an aspect, if the artist of the original audio recording is represented by the system provider or licensee, the royalty collection is represented. In an aspect, if the outcome from act 604a, searching a media outlet for a match to the processed iteration(s) results in a match, then the system may process act 606b to represent uncollected royalties for collection.

One advantage of the disclosed system is that disclosed system will create all iterations of the original audio recording to claim intellectual property in full studio renderings. Other competitors' systems currently in place will not be able to differentiate this many works.

Blocks of the flowcharts 500-600 support combinations of means for performing the specified functions and combinations of operations for performing the specified functions. It will also be understood that one or more blocks of the flowchart 400, and combinations of blocks in the flowchart 400, can be implemented by special purpose hardware-based computer systems which perform the specified functions, or combinations of special purpose hardware and computer instructions. Also, more, fewer or different steps may be provided.

Alternatively, the system may comprise means for performing each of the operations described above. In this regard, according to an example aspect, examples of means for performing operations may comprise, for example, the processor 202 and/or a device or circuit for executing instructions or executing an algorithm for processing information as described above.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an aspect of the present invention and executed by the processing circuitry. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory Many modifications and other aspects of the inventions set forth herein will come to mind to one skilled in the art to which these inventions pertain having the benefit of the teachings presented in the foregoing descriptions and the associated drawings. Therefore, it is to be understood that the inventions are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system to detect an infringing audio composition, the system comprising:
at least one memory configured to store computer executable instructions; and at least one processor configured to execute the computer executable instructions to:
receive an audio file from a user;
prepare one or more track samples based on the audio file to compare with one or more audio files stored with a digital rights repository;
determine an original audio recording from the digital rights repository based on the one or more track samples;
prepare an acapella version based on the original audio recording and/or an instrumental version based on the original audio recording;
process, by iteratively varying a pitch, a tempo and/or a key of, the original audio recording, the acapella version and/or the instrumental version to create a processed iteration of each of the original audio recording, the acapella version and/or the instrumental version;
automatically compare the processed iteration of each of the original audio recording, the acapella version and/or the instrumental version with the one or more audio files stored with a digital rights repository;
determine a match between the processed iteration of each of the original audio recording, the acapella version and/or the instrumental version and the one or more audio files stored with the digital rights repository; and
determine a digital rights action to take based on the match between the processed iteration of each of the original audio recording, the acapella version and/or the instrumental version and the one or more audio files stored with the digital rights repository.

2. The system of claim 1, where the computer executable instructions to process, by iteratively varying a pitch, a tempo and/or a key of, the original audio recording, the acapella version and/or the instrumental version comprise computer executable instructions to:
iteratively vary the pitch of the original audio recording, the acapella version and/or the instrumental version by a number of pitch steps;
iteratively vary the tempo of the original audio recording, the acapella version and/or the instrumental version by a number of tempo steps; and/or
iteratively vary the key of the original audio recording, the acapella version and/or the instrumental version by a number of key steps.

3. The system of claim 1, where the computer executable instructions to determine the match comprise computer executable instructions to determine one or more copyright infringing matches based on the one or more audio files stored with the digital rights repository.

4. The system of claim 1, where the computer executable instructions to determine a digital rights action comprise computer executable instructions to search a media outlet for a match to the processed iteration of each of the original audio recording, the acapella version and/or the instrumental version.

5. The system of claim 1, where the computer executable instructions to determine the digital rights action comprise computer executable instructions to, responsive to determining there is no match between the processed iteration of each of the original audio recording, the acapella version and/or the instrumental version and the one or more audio files stored with the digital rights repository, automatically submit the processed iteration of each of the original audio recording, the acapella version and/or the instrumental version for registration with a digital rights agency.

6. The system of claim 1, where the computer executable instructions to determine the digital rights action comprise computer executable instructions to responsive to determining there is more than one match between the processed iteration of each of the original audio recording, the acapella version and/or the instrumental version and the one or more audio files stored with the digital rights repository, notify a digital rights holder of a royalty collection.

7. A method to detect an infringing audio composition, the method comprising:
   receiving an audio file from a user;
   preparing one or more track samples based on the audio file to compare with one or more audio files stored with a digital rights repository;
   determining an original audio recording from the digital rights repository based on the one or more track samples;
   preparing an acapella version based on the original audio recording and/or an instrumental version based on the original audio recording;
   processing, by iteratively varying a pitch, a tempo and/or a key of, the original audio recording, the acapella version and/or the instrumental version to create a processed iteration of each of the original audio recording, the acapella version and/or the instrumental version;
   automatically comparing the processed iteration of each of the original audio recording, the acapella version and/or the instrumental version with the one or more audio files stored with a digital rights repository;
   determining a match between the processed iteration of each of the original audio recording, the acapella version and/or the instrumental version and the one or more audio files stored with the digital rights repository; and
   determining a digital rights action to take based on the match between the processed iteration of each of the original audio recording, the acapella version and/or the instrumental version and the one or more audio files stored with the digital rights repository.

8. The method of claim 7, where processing, by iteratively varying a pitch, a tempo and/or a key of, the original audio recording, the acapella version and/or the instrumental version comprises:
   iteratively varying the pitch of the original audio recording, the acapella version and/or the instrumental version by a number of pitch steps;
   iteratively varying the tempo of the original audio recording, the acapella version and/or the instrumental version by a number of tempo steps; and/or
   iteratively varying the key of the original audio recording, the acapella version and/or the instrumental version by a number of key steps.

9. The method of claim 7, where determining the match comprises determining one or more copyright infringing matches based on the one or more audio files stored with the digital rights repository.

10. The method of claim 7, where determining the digital rights action comprises searching a media outlet for a match to the processed iteration of each of the original audio recording, the acapella version and/or the instrumental version.

11. The method of claim 7, where determining the digital rights action comprises, responsive to determining there is no match between the processed iteration of each of the original audio recording, the acapella version and/or the instrumental version and the one or more audio files stored with the digital rights repository, automatically submitting the processed iteration of each of the original audio recording, the acapella version and/or the instrumental version for registration with a digital rights agency.

12. The method of claim 7, where determining the digital rights action comprises, responsive to determining there is more than one match between the processed iteration of each of the original audio recording, the acapella version and/or the instrumental version and the one or more audio files stored with the digital rights repository, notifying a digital rights holder of a royalty collection.

13. A computer program product comprising a non-transitory computer readable medium having stored thereon computer executable instructions, which when executed by one or more processors, cause the one or more processors to detect an infringing audio composition, the operations comprising:
   receiving an audio file from a user;
   preparing one or more track samples based on the audio file to compare with one or more audio files stored with a digital rights repository;
   determining an original audio recording from the digital rights repository based on the one or more track samples;
   preparing an acapella version based on the original audio recording and/or an instrumental version based on the original audio recording;
   processing, by iteratively varying a pitch, a tempo and/or a key of, the original audio recording, the acapella version and/or the instrumental version to create a processed iteration of each of the original audio recording, the acapella version and/or the instrumental version;
   automatically comparing the processed iteration of each of the original audio recording, the acapella version and/or the instrumental version with the one or more audio files stored with a digital rights repository;
   determining a match between the processed iteration of each of the original audio recording, the acapella version and/or the instrumental version and the one or more audio files stored with the digital rights repository; and
   determining a digital rights action to take based on the match between the processed iteration of each of the original audio recording, the acapella version and/or the instrumental version and the one or more audio files stored with the digital rights repository.

14. The computer program product of claim 13, where the operations for processing, by iteratively varying a pitch, a tempo and/or a key of, the original audio recording, the acapella version and/or the instrumental version comprises operations for:
   iteratively varying the pitch of the original audio recording, the acapella version and/or the instrumental version by a number of pitch steps;
   iteratively varying the tempo of the original audio recording, the acapella version and/or the instrumental version by a number of tempo steps; and/or iteratively varying the key of the original audio recording, the acapella version and/or the instrumental version by a number of key steps.

15. The computer program product of claim 13, where the operations for determining the match comprise operations for determining one or more copyright infringing matches based on the one or more audio files stored with the digital rights repository.

16. The computer program product of claim 13, where the operations for determining the digital rights action comprise operations for searching a media outlet for a match to the processed iteration of each of the original audio recording, the acapella version and/or the instrumental version.

17. The computer program product of claim 13, where the operations for determining the digital rights action comprise operations for, responsive to determining there is no match between the processed iteration of each of the original audio recording, the acapella version and/or the instrumental version and the one or more audio files stored with the digital rights repository, automatically submitting the processed iteration of each of the original audio recording, the acapella version and/or the instrumental version for registration with a digital rights agency.

18. The computer program product of claim 13, where the operations for determining the digital rights action comprise operations for, responsive to determining there is more than one match between the processed iteration of each of the original audio recording, the acapella version and/or the instrumental version and the one or more audio files stored with the digital rights repository, notifying a digital rights holder of a royalty collection.

19. The computer program product of claim 13, further comprising operations for performing a compression operation on the original audio recording, the acapella version based on the original audio recording and/or the instrumental version based on the original audio recording.

20. The computer program product of claim 13, further comprising operations for resampling the original audio recording, the acapella version based on the original audio recording and/or the instrumental version based on the original audio recording at a selected data rate.

* * * * *